Dec. 19, 1967 R. N. DUNAVAN 3,359,540
SAFETY SIGNAL SYSTEM FOR MOTOR VEHICLES
Filed April 28, 1965
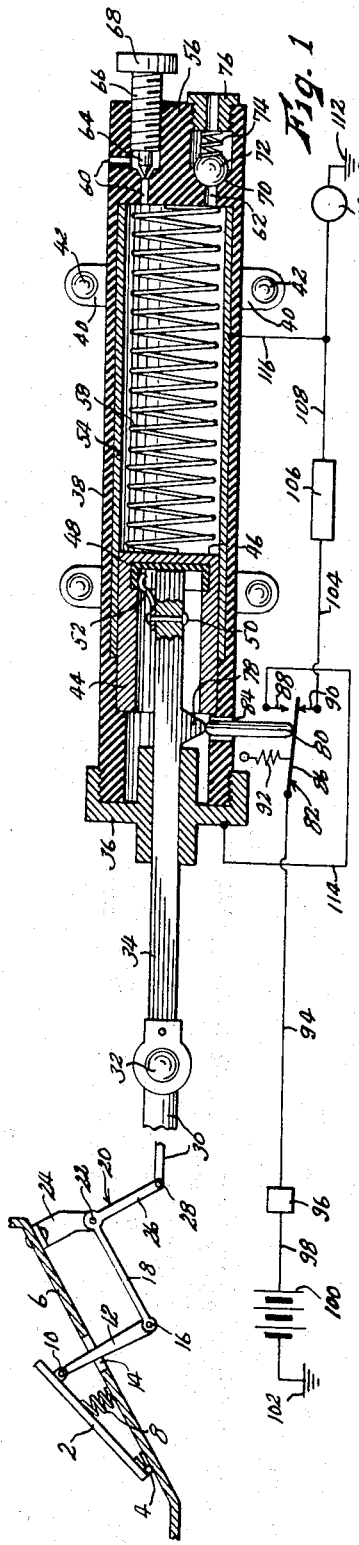
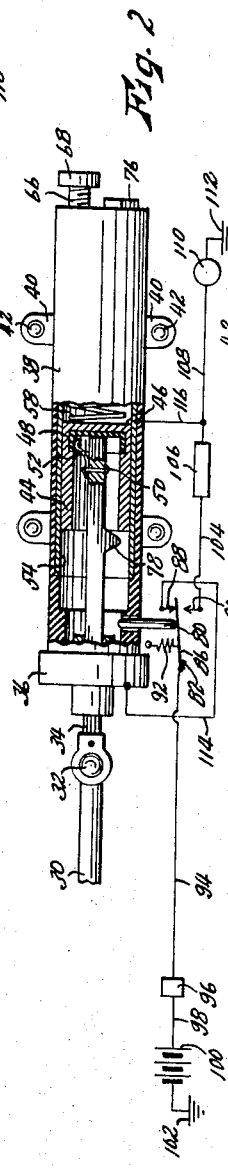
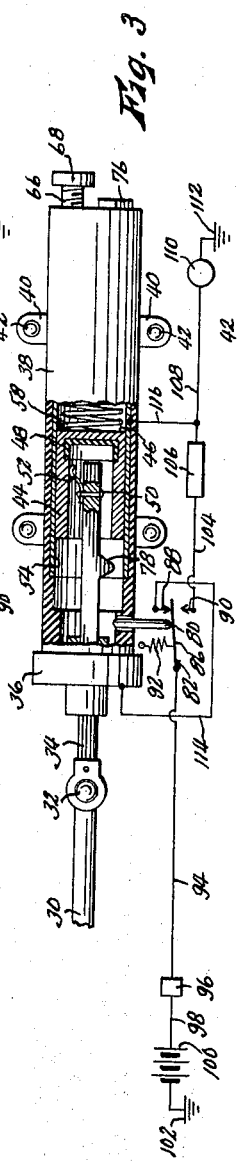
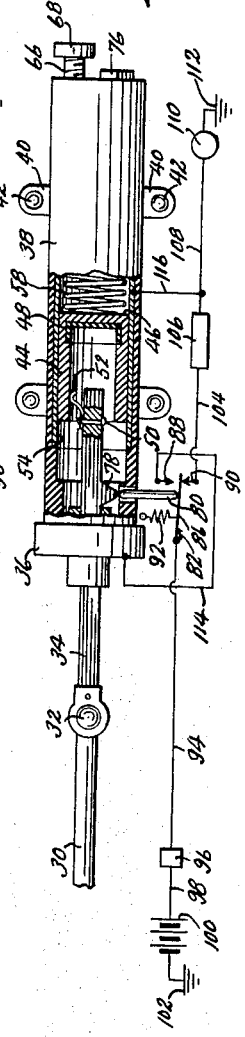
INVENTOR.
Russell N. Dunavan
BY John A. Hamilton
Attorney.

United States Patent Office 3,359,540
Patented Dec. 19, 1967

3,359,540
SAFETY SIGNAL SYSTEM FOR MOTOR VEHICLES
Russell N. Dunavan, 8619 Hadley,
Overland Park, Kans. 66212
Filed Apr. 28, 1965, Ser. No. 451,527
8 Claims. (Cl. 340—72)

ABSTRACT OF THE DISCLOSURE

A safety signal system for motor vehicles including a signal device such as a signal lamp mounted on the vehicle and visible to following vehicles, and means operable by deceleration of the vehicle to maintain said lamp inoperative so long as the rate of deceleration remains within rates normal to highway driving, to energize said lamp if the rate of deceleration exceeds these normal rates, and to give a further distinguishable signal, as by flashing said lamp, if the rate of deceleration reaches a maximum, as by the driver completely removing his foot from the accelerator pedal.

---

This invention relates to new and useful improvements in safety signals for automobiles and other motor vehicles, and has particular reference to a signal system for indicating to other drivers various actions which the vehicle equipped with the system is preparing to take, at an earlier time than such actions would otherwise be apparent to said other drivers.

The principal object of the present invention is the provision of a signal system operable entirely automatically through movement of the usual accelerator pedal to actuate a signal visible to drivers of other vehicles whenever the vehicle so equipped is about to slow down or stop, whether or not the brakes are applied to actuate the usual brake signal lights, and in any event before said brakes are applied. Accidents resulting from driver's slowing their vehicles too rapidly, or more rapidly than other drivers normally expect under certain conditions, such as on superhighways, are of course common. Some drivers lift their feet from the accelerator pedal very early when intending to stop, and decelerate substantially, long before they apply the brakes, or may decelerate to a substantial and potentially dangerous degree even without lifting their feet entirely away from the accelerator pedal.

Conversely, the actuation of a signal device such as described for low rates of deceleration which could occur in normal speed variations as encountered in customary driving would serve no useful purpose, and might be confusing and annoying to ther drivers. Accordingly, another object of the invention is the provision of a signal system of the character described which is selective in operation in that it will not actuate the signal for rates of deceleration within such normal speed variations, but will actuate the signal for any greater rate of deceleration.

A further object is the provision of a signal system of the character described which is still more selective in that it will actuate one signal at the lower rates of deceleration which are great enough to require a signal, and which will actuate another signal, or the same signal in a different manner indicating greater urgency, for the maximum rate of deceleration which can occur without braking, as when the driver lifts his foot entirely free of the accelerator pedal.

A still further object is the provision of a signal system of the character described which will further indicate to other drivers whenever a parked car is about to start its motion.

Other objects are simplicity and economy of construction, efficiency and dependability of operation, and adaptability to be applied to pre-existing vehicles with a minimum of adaptation.

With these objects in view, as well as other objects which will appear in the course of the specification, reference will be had to the accompanying drawing, wherein:

FIG. 1 is a partially diagrammatic view of a safety signal system for motor vehicles embodying the present invention, including a longitudinal sectional view of the barrel and plunger assembly forming the central feature of the invention, and showing the parts in the positions assumed when the vehicle is at rest, FIG. 2 is a fragmentary view similar to FIG. 1, with parts left in elevation, but showing the parts in the positions assumed when the vehicle is moving at a uniform speed, FIG. 3 is a view similar to FIG. 2, but showing the parts in the positions assumed whenever the vehicle is decelerating at greater than a predetermined rate, and FIG. 4 is a view similar to FIG. 2 but showing the parts in the positions assumed whenever the driver lifts his foot from the accelerator pedal.

Like reference numerals apply to similar parts throughout the several views, and the numeral 2 applies to the accelerator pedal of an automotive vehicle, said pedal being hinged as at 4 to the floorboard 6 of the vehicle, and normally held in an elevated position by spring 8. Said pedal is pivotably connected as at 10 to one end of a link 12, said link extending through a hole 14 of the floorboard and being pivoted at its opposite end, as at 16, to one arm 18 of a bell-crank lever 20, said lever being pivoted, as at 22, to a bracket 24 affixed to the floorboard. The other arm 26 of lever 20 is pivoted at 28 to one end of a push rod 30. It will be understood that said push rod has the usual connection, not shown, to the engine carburetor, whereby the driver controls the speed of the vehicle by pressure on pedal 2. In accordance with the present invention, push rod 30 is additionally connected, as by pivot 32, to a plunger 34, but is electrically insulated from said plunger. Said plunger is mounted for longitudinal sliding movement in the end cap member 36, which is formed of electrical conducting material, of a hollow cylindrical barrel 38, which is formed of plastic or other suitable insulating material. Said barrel is provided with ears 40 for receiving bolts 42 or the like for mounting said barrel rigidly with respect to the vehicle frame. Plunger 34 is adapted to be advanced inwardly into the barrel by downward pressure on accelerator pedal 2, and to be retracted by pedal spring 8.

Mounted slidably in barrel 38 is a hollow piston 44 formed of electrical conducting material, and having an end wall 46, the inner end of plunger 34 extending into said piston and being operable to abut and move said piston to the right in said barrel, as shown, as said plunger is advanced. Internally, piston 44 is provided at its closed end with a cup-shaped insulator member 48 against which the inner end of plunger 34 abuts whenever it engages the piston, this being the only point of contact between the plunger and piston. Affixed to one side of said plunger, within the piston, as by rivet 50 is a leaf spring electrical contact 52. Whenever the plunger is in engagement with insulator cup 48, as in FIGS. 1 and 2, contact 52 also engages said cup. However, whenever plunger 34 is retracted farther to the left than the piston, as in FIGS. 3 and 4, contact 52 is retracted out of cup 48, and establishes electrical contact with the piston. Piston 44 moves in a cylindrical sleeve 54 fixed internally in barrel 38, and has electrical contact therewith at all times, and has sealing contact with said sleeve, whereby to prevent leakage of air past the piston.

Barrel 38 has an end wall 56 closing the end thereof opposite from cap 36. Piston 44 is urged at all times toward plunger 34 by a compression spring 58 disposed within the barrel, one end of said spring bearing against end wall 46 of the piston and the other end of the spring bearing against barrel end wall 56. End wall 56 is provided with an air inlet passage 60 and an air outlet passage 62. Inlet passage 60 is adjustably regulated by a needle valve 64 having a stem 66 threaded in the barrel and a knob 68 at the outer end of said stem whereby said valve may be regulated from a position external to the barrel. Outlet passage 62 has an outwardly opening valve seat 70 into which a check valve ball 72 is releasably urged by a spring 74 which is retained by a tubular plug 76 threaded in the barrel.

Plunger 34 is provided, at a point thereof within barrel 38 and normally adjacent the open end of piston 44, with a laterally projecting ear 78 so positioned that whenever said plunger is retracted fully to the left, as in FIGS. 1 and 4, as occasioned by the driver lifting his foot free of accelerator pedal 2, said ear engages and depresses the operating button 80 of a micro-switch indicated generally by the numeral 82, said switch being mounted externally of the barrel and button 80 extending through a hole 84 of said barrel. Said micro-switch includes an armature 86 movable between fixed contacts 88 and 90, said armature normally being held in engagement with contact 88 by spring 92 but being movable into engagement with contact 90 by depression of button 80. Said armature of course cannot engage both contacts simultaneously. Armature 86 is connected through wire 94, the usual ignition switch 96 and wire 98 to one terminal of the usual automobile battery 100, the opposite terminal of the battery being grounded at 102. Contact 90 of the switch is connected through wire 104, a flasher switch 106 and wire 108 to one terminal of a signal lamp 110, the other terminal of said lamp being grounded at 112. Signal lamp 110 may be of any suitable type, preferably being mounted in a reflector housing at the rear of the vehicle so as to be visible to drivers who may be following, and covered by an amber lens to indicate caution. Other types of signals could be used, such as electrically actuated semaphores or other "movement" type signals, or "signboard" signals wherein printed signs indicating emergency conditions are illuminated or exposed. Also, any number of signals or signal lamps could be used rather than the single lamp shown, if it should be desired that said signals be given for example at both sides of the rear of the automobile or at the front of the automobile as well as at the rear. Contact 88 of switch 82 is connected by wire 114 to end cap 36 of the barrel, and internal sleeve 54 of said barrel is connected to lamp 110 by wires 116 and 108.

In operation, it will be seen that when the vehicle is at rest and parked, the parts will have the relative positions shown in FIG. 1, plunger 34 being fully retracted to the left by accelerator pedal spring 8 so that ear 78 of said plunger closes armature 86 of switch 82 on contact 90, and piston 44 is urged against said plunger by spring 58, so that spring contact 52 of the plunger engages insulator cup 48 of said piston. Thus signal lamp 110 is not lighted so long as ignition switch 96 is open. When the driver closes switch 96 preparatory to starting the engine, a circuit is completed from battery 100 through wire 98, ignition switch 96, wire 94, armature 86 and contact 90 of switch 82, wire 104, flasher switch 106 and wire 108 to lamp 110. Said lamp is thus lighted, and due to the action of flasher switch 106 it flashes on and off intermittently, thus giving a warning to pedestrians and other drivers nearby that the car is about to start its movement. This feature of the invention is a useful adjunct to the primary "change-of-speed" signals to be described, which are the main function of the invention.

When the vehicle has been set in motion, and as long as it is either accelerating or is travelling at a generally constant speed, the parts will have the relative positions shown in FIG. 2. As plunger 34 is advanced into barrel 38 in response to downward movement of accelerator pedal 2, it of course pushes piston 44 ahead of it and this advance of the piston is free because air compressed ahead of the piston opens check valve 72 to permit the free egress of air from the barrel. Springs 58 and 74 may be of very light tension so as not to inhibit depression of pedal 2 to any appreciable degree, and if desired pedal spring 8 could be weakened to compensate for the added tension of springs 58 and 74. Lamp 110 is not lighted at this time, since switch 82 is then closed on contact 88, and contact 52 of "switch" 52–44 is in engagement with insulator 48, so that "switch" 52–44 is open. Moreover, when the driver decelerates the vehicle by allowing pedal 2 to rise partially, no signal will be given as long as the pedal is released, and plunger 34 retracted, at a rate slow enough to allow piston 44 to be maintained against the end of the plunger by spring 58. The rate at which said piston may be retracted by spring 58 is of course determined by the rate at which air can enter the barrel through passage 60, and is regulated by the setting of needle valve 64. Normally, said needle valve is set at such a degree of restriction that piston 44 can follow the retraction movement of plunger 34, and remain in engagement therewith to keep switch 52–44 open, so long as the rate of deceleration of the vehicle, as reflected by the rate of retraction of plunger 34, is within the rate of deceleration normally to be expected in usual highway driving, and hence reflecting no particular danger to following vehicles. Within this range, signals to the following drivers would serve little useful purpose, and could in effect be simply a source of confusion to the following drivers.

If however the driver should decelerate his vehicle at a rate greater than that discussed above, resulting in a more rapid retraction of plunger 34, but still does not lift his foot entirely free of pedal 2, the parts will assume the relative positions shown in FIG. 3. It will be seen therein that plunger 34 has been retracted more rapidly than piston 44 has been allowed to follow by the leakage of air through needle valve 64, with the result that contact 52 of the plunger has withdrawn from insulator cup 48 of the piston and come into engagement with the conducting body portion of said piston. This completes a circuit from battery 100 through wire 98, ignition switch 96, wire 94, armature 86 and contact 88 of switch 82, wire 114, cap 36, plunger 34, contact 52, piston 44, sleeve 54 and wires 116 and 108 to lamp 110, turning said lamp on steadily as a signal to following drivers that the vehicle is decelerating at a somewhat unusual rate, and that caution should be observed. After a time interval during which piston 44 "catches up" with the retracting movement of the plunger to again cause engagement of contact 52 with insulator cup 48 to "open" switch 52–44, lamp 110 will again go off, provided that the driver has not eased off still further on pedal 2, or removed his foot entirely therefrom. By that time, the vehicle speed has generally levelled off at a lower rate, and no further need for a signal exists.

If at any time the driver should lift his foot entirely free of accelerator pedal 2, whereby to cause deceleration of the vehicle at the maximum rate possible without applying the brakes, then as shown in FIG. 4, ear 78 of the plunger depresses operating button 80 of switch 82 to close said switch on contact 90 to cause operation of lamp 110 through flasher switch 106 as previously described, regardless of the position of piston 44. The flashing operation of the lamp inherently indicates a need for greater caution to following drivers, as will be required in view of the greater rate of deceleration. Of course the driver may immediately apply the brakes and thereby actuate the usual brake signal lamps, but the signal is highly desirable because the driver may have no intention of coming to a full stop and hence may not apply the brakes, and further because many drivers have the sometimes dangerous habit, when intending to stop or turn, of releasing the accelerator pedal and allowing the vehicle to decelerate without braking for a considerable time before applying the brakes. The present signal operates regardless of whether the brakes are applied or not, and in any case gives warning before the brakes are applied. Also, once pedal 2 has been released, the flashing operation of lamp 110 continues until the vehicle has come to a full stop and ignition switch 96 is opened or until the accelerator pedal is again depressed to open contact 90 of switch 82.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A safety signal system for a motor vehicle having an accelerator pedal adapted by depression thereof to increase the speed of said vehicle and by release thereof to decrease the speed of said vehicle, said signal system comprising:
   (a) an electrically actuated signal device adapted to be mounted on said vehicle,
   (b) a normally closed first electric switch,
   (c) a normally open second electric switch,
   (d) a first electric circuit including said signal device, said first switch and a source of electric power,
   (e) a second electric circuit including said signal device, said second switch and said source of electric power,
   (f) means operable by said accelerator pedal to open said first switch whenever said pedal is depressed, and
   (g) means operable by said accelerator pedal to close said second switch whenever said pedal is released at greater than a predetermined rate.

2. A safety signal system as recited in claim 1 with the addition of:
   (a) means preventing simultaneous completion of said first and second electric circuits.

3. A safety signal system as recited in claim 1 with the addition of:
   (a) distinguishing means included in one of said electric circuits and operable to cause operation of said signal device when actuated by that circuit which is distinguishable from the operation of said device when actuated by the other of said circuits.

4. A safety signal system as recited in claim 3 wherein said signal device comprises an electric lamp, and wherein said distinguishing means comprises a flasher switch operable to cause flashing operation of said lamp, said flasher switch being included in said first electric circuit.

5. A safety signal system for a motor vehicle having an accelerator pedal adapted by depression thereof to increase the speed of said vehicle and by release thereof to decrease the speed of said vehicle, said signal system comprising:
   (a) a tubular barrel adapted to be fixed relative to the frame of said vehicle,
   (b) a piston mounted in said barrel and being slidably movable therein,
   (c) a plunger longitudinally slidable in said barrel,
   (d) means interconnecting said accelerator pedal with said plunger whereby the latter is advanced to abut and advance said piston in said barrel whenever said pedal is depressed, and whereby said plunger is retracted when said pedal is released,
   (e) means biasing said piston in the direction of retraction of said plunger,
   (f) adjusting means for regulating the speed of retracting movement of said piston, whereby said piston may be retracted at a slower rate than said plunger, depending on the rate of release of said pedal,
   (g) an electric switch operable by relative movement of said plunger and piston and being operable to close whenever said plunger is retracted at a higher rate than said plunger,
   (h) an electrically actuated signal device adapted to be mounted on said vehicle, and
   (i) an operative electric circuit including said signal device, said switch and a source of electric power.

6. A safety signal system as recited in claim 5 wherein said piston seals said barrel whereby air is compressed in said barrel ahead of said piston as said piston is advanced, wherein said barrel is provided with air inlet and outlet openings ahead of said piston, said adjusting means constituting a manually operable valve adjustably restricting said inlet opening, and with the addition of a check valve permitting free egress of air from said barrel through said outlet opening but preventing entry of air through said outlet opening.

7. A safety signal system as recited in claim 5 with the addition of:
   (a) a second electric switch operable by said plunger and operable to close only when said plunger is fully retracted,
   (b) an electrically actuated signal device distinguishable in operation from said first named signal device, and
   (c) a second electric circuit including said second electric switch, said source of electric power, and said last named signal device.

8. A safety signal system as recited in claim 7 with the addition of:
   (a) a third electric switch included in said first electric circuit and operable in conjunction with said second switch by said plunger, said second and third switches being mechanically interrelated in such a manner that they cannot be closed simultaneously, and one is always open when the other is closed.

References Cited

UNITED STATES PATENTS

| | | | |
|---|---|---|---|
| 2,420,351 | 5/1947 | Brown | 340—262 |
| 2,442,971 | 6/1948 | Chessrown | 340—66 X |
| 2,638,517 | 5/1953 | Zarski | 340—66 X |

THOMAS B. HABECKER, *Acting Primary Examiner.*

NEIL C. READ, *Examiner.*

A. H. WARING, *Assistant Examiner.*